(12) United States Patent
Curewitz et al.

(10) Patent No.: US 9,779,138 B2
(45) Date of Patent: Oct. 3, 2017

(54) METHODS AND SYSTEMS FOR AUTONOMOUS MEMORY SEARCHING

(71) Applicant: Micron Technology, Inc., Boise, ID (US)

(72) Inventors: Kenneth M Curewitz, Cameron Park, CA (US); Sean Eilert, Penryn, CA (US); Hongyu Wang, Folsom, CA (US); Ameen D. Akel, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 291 days.

(21) Appl. No.: 13/965,739

(22) Filed: Aug. 13, 2013

(65) Prior Publication Data

US 2015/0052114 A1 Feb. 19, 2015

(51) Int. Cl.
*G06F 17/30* (2006.01)
*G06F 17/00* (2006.01)

(52) U.S. Cl.
CPC .............. *G06F 17/30519* (2013.01)

(58) Field of Classification Search
CPC ................................. G06F 17/30519
See application file for complete search history.

(56) References Cited

U.S. PATENT DOCUMENTS

| | | | |
|---|---|---|---|
| 5,134,711 A | 7/1992 | Asthana et al. | |
| 5,590,370 A | 12/1996 | Asthana et al. | |
| 5,671,430 A | 9/1997 | Gunzinger | |
| 6,105,130 A | 8/2000 | Wu et al. | |
| 6,131,139 A * | 10/2000 | Kikuchi | G06F 13/161 365/185.33 |
| 7,242,216 B1 | 7/2007 | Schmit et al. | |
| 7,581,080 B2 | 8/2009 | Beaumont | |
| 7,623,365 B2 | 11/2009 | Jeddeloh | |
| 7,634,622 B1 | 12/2009 | Musoll et al. | |
| 7,913,033 B2 | 3/2011 | Roohparvar | |
| 8,427,952 B1 | 4/2013 | Pearce | |
| 8,775,685 B1 | 7/2014 | Brebner | |

(Continued)

FOREIGN PATENT DOCUMENTS

| | | |
|---|---|---|
| EP | 0482741 A2 | 4/1992 |
| GB | 2220509 A | 10/1990 |

(Continued)

OTHER PUBLICATIONS

"Apparatus and Methods for a Distributed Memory System Including Memory Nodes", U.S. Appl. No. 13/842,984, filed Mar. 15, 2013, 28 pgs.

(Continued)

*Primary Examiner* — Yicun Wu
(74) *Attorney, Agent, or Firm* — Schwegman Lundberg & Woessner, P.A.

(57) ABSTRACT

Methods and systems operate to receive a plurality of search requests for searching a database in a memory system. The search requests can be stored in a FIFO queue and searches can be subsequently generated for each search request. The resulting plurality of searches can be executed substantially in parallel on the database. A respective indication is transmitted to a requesting host when either each respective search is complete or each respective search has generated search results.

43 Claims, 8 Drawing Sheets

(56) References Cited

U.S. PATENT DOCUMENTS

| | | |
|---|---|---|
| 2001/0049744 A1 | 12/2001 | Hussey et al. |
| 2002/0108017 A1* | 8/2002 | Kenchammana-Hoskote ................ G06F 12/0804 711/113 |
| 2002/0147724 A1* | 10/2002 | Fries et al. .................... 707/100 |
| 2007/0204116 A1 | 8/2007 | Wallner et al. |
| 2008/0005116 A1 | 1/2008 | Uno |
| 2008/0077736 A1* | 3/2008 | Mukherjee et al. .......... 711/114 |
| 2008/0109424 A1* | 5/2008 | Day et al. .......................... 707/5 |
| 2009/0164678 A1 | 6/2009 | Hu |
| 2009/0319550 A1 | 12/2009 | Shau et al. |
| 2010/0165991 A1 | 7/2010 | Veal et al. |
| 2010/0211721 A1 | 8/2010 | Resnick |
| 2011/0067039 A1 | 3/2011 | Eilert et al. |
| 2012/0047126 A1 | 2/2012 | Branscome et al. |
| 2012/0054452 A1 | 3/2012 | Kumar et al. |
| 2012/0102275 A1 | 4/2012 | Resnick |
| 2012/0203761 A1* | 8/2012 | Biran et al. ................... 707/713 |
| 2013/0054727 A1 | 2/2013 | Kumano et al. |
| 2013/0173655 A1* | 7/2013 | Hoots, III et al. ........... 707/769 |
| 2014/0143501 A1* | 5/2014 | Creamer et al. ............. 711/136 |
| 2014/0281278 A1 | 9/2014 | Curewitz et al. |
| 2015/0153963 A1 | 6/2015 | Curewitz et al. |

FOREIGN PATENT DOCUMENTS

| | | |
|---|---|---|
| KR | 20060132856 A | 12/2006 |
| KR | 20110028211 A | 3/2011 |
| KR | 1020130000083 A | 1/2013 |
| KR | 1020130073991 A | 7/2013 |
| TW | 201518968 A | 5/2015 |
| WO | WO-2015023625 A1 | 2/2015 |
| WO | WO-2015084728 A1 | 6/2015 |

OTHER PUBLICATIONS

"International Application Serial No. PCT/US2014/050624, International Preliminary Report on Patentability dated Feb. 25, 2016", 7 pgs.

"International Application Serial No. PCT/US2014/050624, International Search Report dated Nov. 28, 2014", 3 pgs.

"International Application Serial No. PCT/US2014/050624, Written Opinion dated Nov. 28, 2014", 5 pgs.

"International Application Serial No. PCT/US2014/067927, International Search Report dated Mar. 25, 2015", 6 pgs.

"International Application Serial No. PCT/US2014/067927, Written Opinion dated Mar. 25, 2015", 7 pgs.

"European Application Serial No. 14836383.1, Extended European Search Report dated Mar. 2, 2017", 10 pgs.

"International Application Serial No. PCT/US2014/067927, International Preliminary Report on Patentability dated Jun. 16, 2016", 9 pgs.

"Korean Application Serial No. 10-2016-7006563, Office Action dated Dec. 21, 2016", W/ English Translation, 9 pgs.

"Korean Application Serial No. 10-2016-7006563, Response filed Apr. 19, 2017 to Office Action dated Dec. 21, 2016", 29 pgs.

"Korean Application Serial No. 10-2016-7017509, Office Action dated Dec. 21, 2016", W/ English Translation, 14 pgs.

U.S. Appl. No. 14/094,273, filed Dec. 2, 2013, Methods and Systems for Autonomous Memory.

* cited by examiner

METHODS AND SYSTEMS FOR AUTONOMOUS MEMORY SEARCHING

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and non-volatile (e.g., flash) memory.

A number of non-volatile memory devices can be combined to make a solid state drive (SSD) that can emulate a mechanically-operated hard disk drive in a computer system. Solid state drives can provide faster access with greater reliability than mechanical hard drives due to the lack of moving parts.

Due at least in part to the increasing performance of computer systems, memory and solid state drive manufactures are under constant pressure to increase the performance of their memory in order to try to keep pace with the computer system performance increases. One way for memory manufacturers to increase memory performance is to decrease memory read/write times. However, advancements in memory technology may hinder that effort. Another way to increase memory performance can be to make searches of memory and SSDs more efficient.

DETAILED DESCRIPTION

Figure 1:
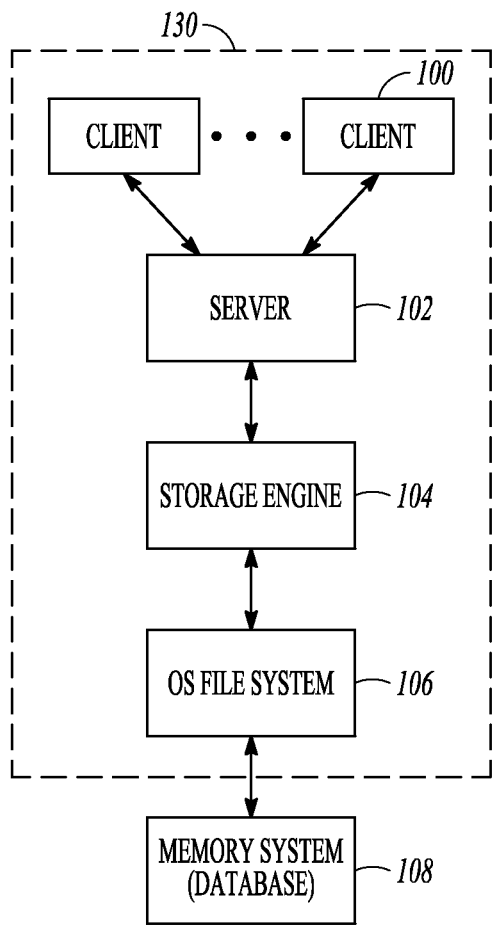
FIG. 1 illustrates a block diagram of an embodiment of a database storage system.

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Subsequent reference is made to solid state drives (SSDs) for purposes of illustration only. Autonomous memory searching operations, as disclosed herein, may work equally well on any type of memory device or group of memory devices including semiconductor memory, optical memory, or magnetic memory. Thus, the present disclosure is not limited to searches of SSDs.

Subsequent reference is also made to structured query language (SQL) and the term "MySQL". SQL, as is known in the art, refers to a special purpose programming language designed for managing a relational database. The term "MySQL" refers to a branded relational database management system that runs as a server to provide multi-user access to a number of databases. A MySQL™ database system can often be characterized as a structured database. The references herein to SQL and MySQL™ databases are thus for purposes of illustration only. Embodiments of the autonomous memory search method disclosed herein may work equally well on other types of databases storing both structured and unstructured data. For example, any key-value store database (e.g., a NoSQL database) may use the autonomous memory searching method.

As used herein, structured data can be data that is organized into discrete records (e.g., elements). The records can be made up of one or more fields. An example of structure data might be records that are partitioned into name, address, and identifying information.

As used herein, unstructured data can be data that is not organized into discrete records (e.g., elements). An example of unstructured data might be text from a book, a digital image, or a digital representation of human speech.

FIG. 1 illustrates a block diagram of an embodiment of a database system that can include a host 130 and a memory system (e.g., SSD) 108. The host 130 might be a computer system or CPU. The memory system (e.g., SSD) 108 might be a single non-volatile memory device or a plurality of non-volatile memory devices combined into a single unit (e.g., SSD).

The host 130 can comprise a plurality of clients (e.g., client software, programs) 100 that can provide different database functions in the database system. For example, these clients 100 might include database backup routines (e.g., mysqldump routine), table maintenance routines (e.g., mysqlcheck routine), command line interface routines (e.g., mysqlimport routine), and/or other database functions.

The clients 100 communicate with the server 102. The server 102 might be a mysqld (MySQL Server) or some other type of server. The server 102 can be the main program in the database system that manages access to the database stored in the memory system 108 for the clients 100 and a host (e.g., central processing unit, computer, controller).

A storage engine 104 communicates between the server 102 and operating system (OS) file system protocols 106 of the host 130. The storage engine 104 transmits search criteria and search keys to the memory 108 through the OS file system 106 of the host 130 and receives the response to the search back from the memory system 108 through the OS file system 106 of the host 130. The search criteria and search keys are discussed subsequently.

A typical prior art storage engine might communicate large amounts of raw data from a database in memory during a typical search of the database. For example, in a typical prior art search of a database containing thousands of records in a table, most or all of the records are read from the memory into the CPU's main memory for processing by the CPU.

The storage engine 104 for the method for autonomous memory searching can communicate the search criteria and the search keys to the memory system 108 and receive back only the search results that resulted from a database search using the search criteria and search keys. Thus, the storage engine 104 may not have to parse large amounts of raw data and the CPU may not have to use valuable time performing comparisons of search criteria and search keys to the raw data. This can result in a performance enhancement for systems using the methods for autonomous memory searching. This can also result in overall power savings, cost savings, and form factor advantages.

Figure 2:
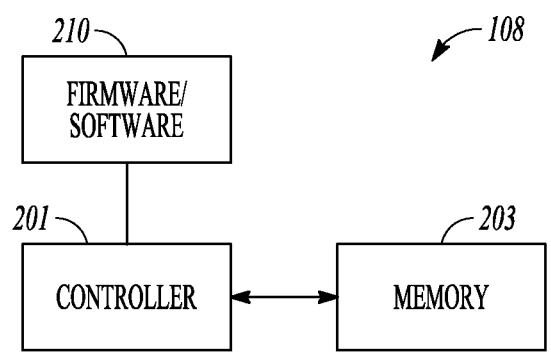
FIG. 2 illustrates a block diagram of an embodiment of a memory system in accordance with the embodiment of FIG. 1.

The memory system 108 can include any type of memory that can store a database to be searched. FIG. 2 illustrates a block diagram of an embodiment for a memory system 108 (e.g., SSD). For example, a plurality of non-volatile memory devices (e.g., Flash memory) can be combined to form the memory block 203. The memory system 108 (e.g., SSD) can have a controller (e.g., processor) 201 coupled to the memory block 203 for controlling operation of the memory system 108 (e.g., SSD). The controller 201 may comprise a module 210 (e.g., firmware or software) to direct the activities of the storage engine 104, according to the protocols and methods described in FIGS. 4-6.

Figure 3A:
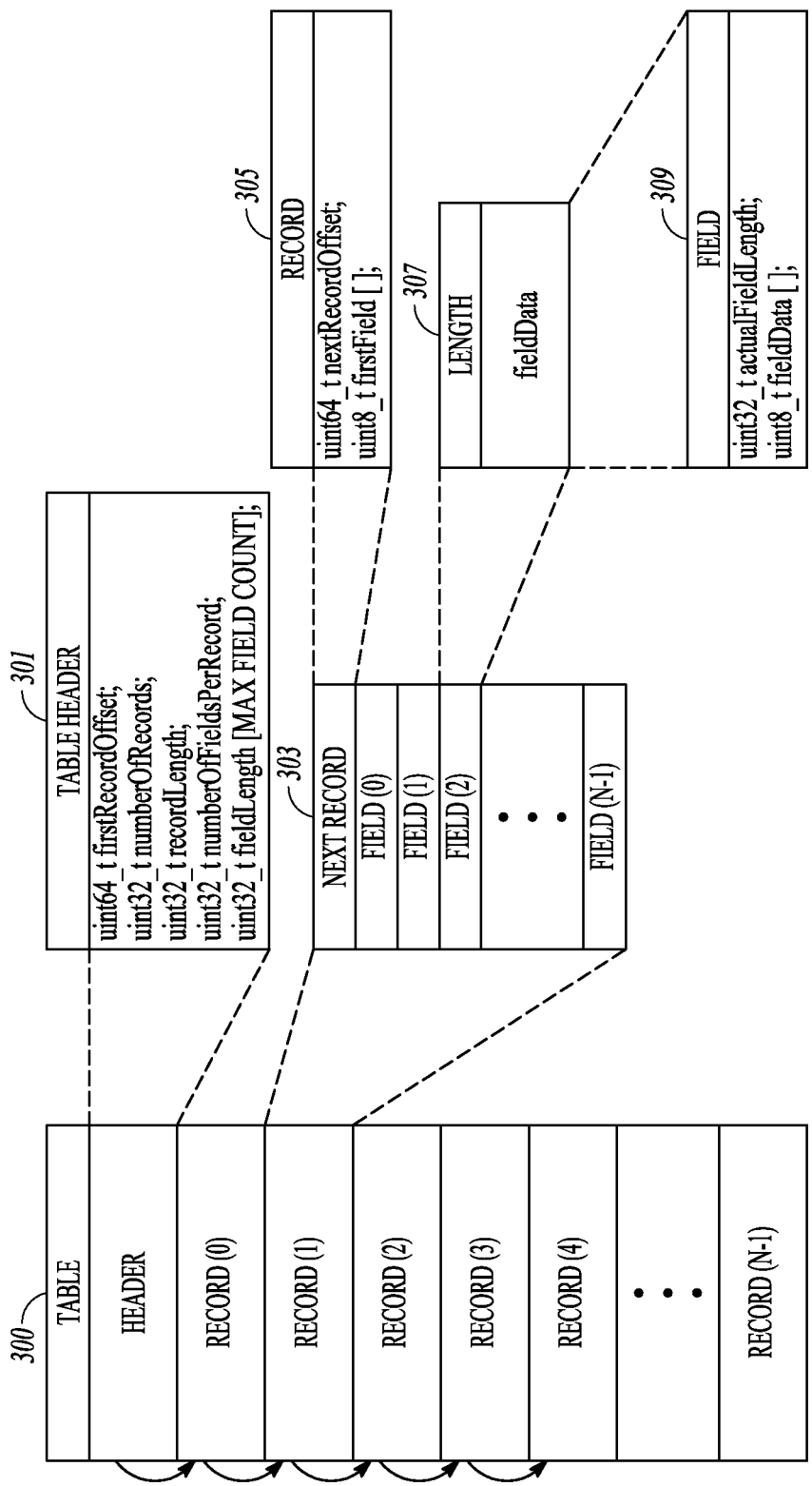
FIGS. 3A and 3B illustrate diagrams of embodiments of database storage formats.

FIG. 3A illustrates a diagram of an embodiment of a database storage format. In the illustrated embodiment, the database can be stored in a tabular format 300. The illustrated table 300 includes a header 301 and 'n' records (e.g., Record(0)-Record(n−1)). Each record can point to the next record in the table 300 so that, when the table 300 is updated with a subsequent record, the previous record can be updated to point to the subsequent record.

The header 301 can include fields describing the table 300. For example, the header 301 can include the number of records in the table 300, a length of each record, a number of fields per record, and a length of each field. Other embodiments might include additional description data in the header 301.

Each record (e.g., Record(0)-Record(n−1) 303 can include a plurality of fields (e.g., Field(0)-Field(m−1)) of the data to be searched. Each record 303 can also include a pointer field 305 to the next record. This pointer field 305 might be a logical address of another location in the memory that contains the next record. Thus, there is no need for the records to be located sequentially in memory.

Each field (e.g., Field(0)-Field(m−1)) can comprise an element 307 that stores the field length and field data. The field data can comprise the actual data 309 to be searched.

Figure 3B:
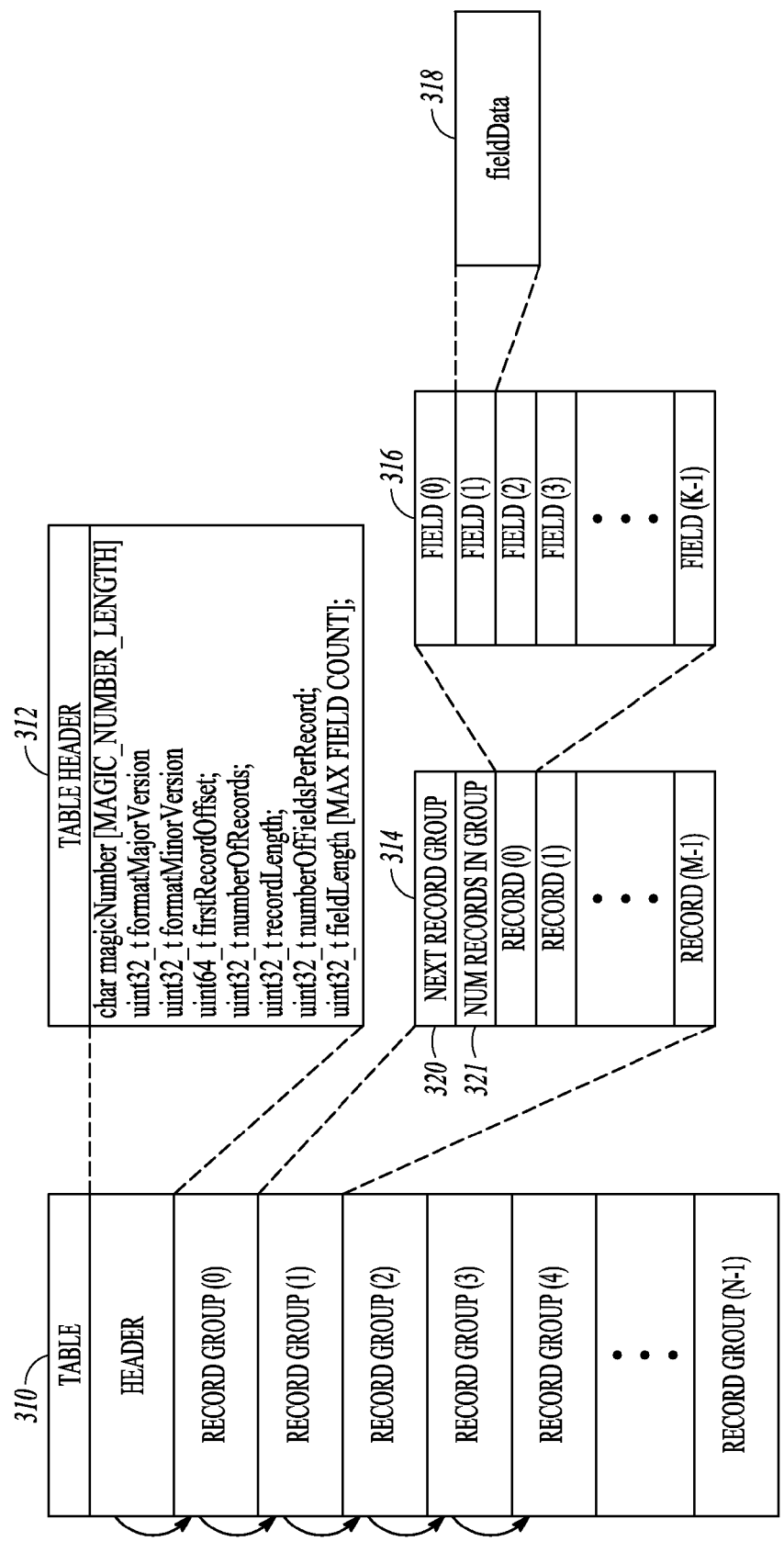

FIG. 3B illustrates another embodiment of a database storage format. This embodiment can also be in a tabular format 310. However, the formats of FIGS. 3A and 3B are for purposes of illustration only. The present embodiments are not limited to any one format, tabular or otherwise.

The table 310 comprises a table header 312 and 'n' record groups (e.g., Record Group(0)-Record Group(n−1)). Each record group can point to the next record group in the table 300 so that, when the table 310 is updated with a subsequent record group, the previous record group can be updated to point to the subsequent record group.

The header 312 can include fields describing the table 310. For example, the header 312 can include a number of record groups, record group length, number of records, number of fields per record, field length, an address (e.g., logical address, physical address) of the first record group, and/or a version number of the table.

Each record group (e.g., Record Group(0)-Record Group (n−1)) 314 can include 'm' records (e.g., Record(0)-Record (m−1)). Each record group 314 can include a pointer 320 to the next record group 314 and a field for the number of records 321 in each record group 314 in addition to the records 316. The pointer 320 might be a logical address of another location in the memory that contains the next record. Thus there is no need for the record groups to be located sequentially in memory.

Each record 316 can comprise 'k' fields 318 of data (e.g., Field(0)-Field(k−1)). Each field 318 can comprise the actual data to be searched.

Figure 4A:
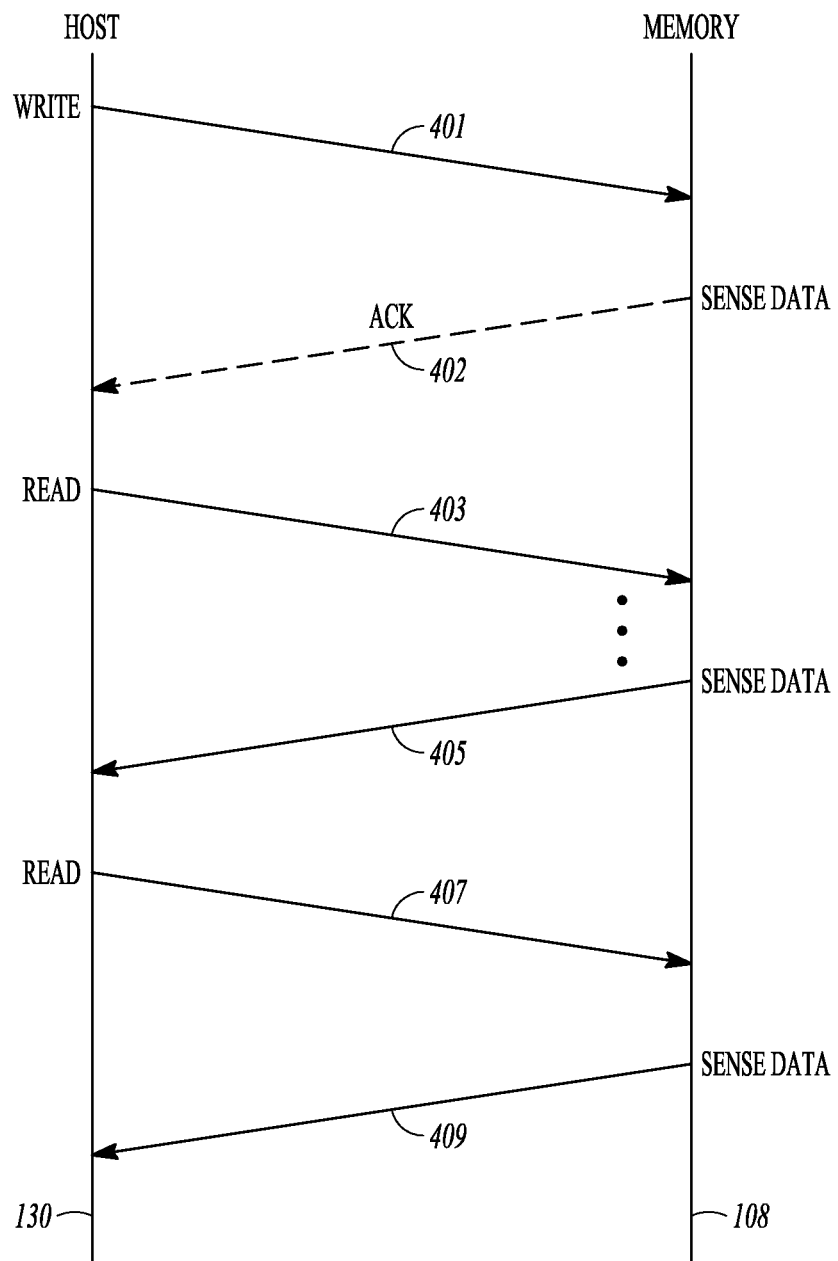
FIGS. 4A and 4B illustrate protocol flow diagrams of embodiments of communication between a host and a memory.
Figure 4B:
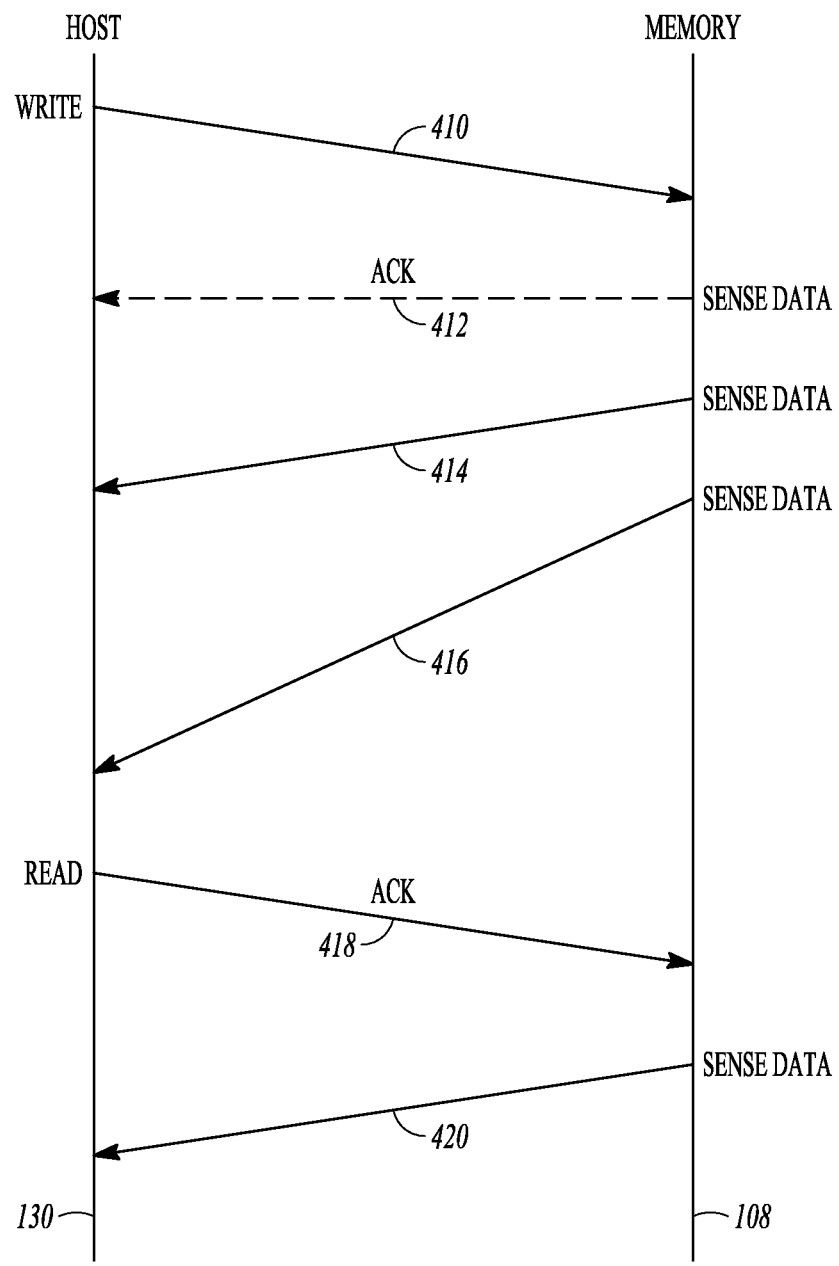

FIGS. 4A and 4B illustrate protocol flow diagrams of two embodiments for communication between the host and the memory system. These embodiments are for purposes of illustration only as other embodiments might use alternate methods.

FIG. 4A illustrates a protocol flow diagram of an embodiment for communication between the host (e.g., CPU, computer) 130 and the memory system 108, as described previously with reference to FIG. 1, during the method for autonomous memory searching. In the illustrated embodiment, three commands can be issued by the storage engine 104 to perform the search. For example, a write command (e.g., small computer system interface (SCSI) write command) followed by two or more read commands can be used to both transfer the search keys and search criteria to the memory system 108 as well as retrieve the results of the database search.

The search of the database in the memory system 108 can be defined by one or more search keys (e.g., patterns), the search criteria (e.g., comparison criteria), and the dataset to be searched (e.g., database). The search can be performed by comparing the search key to the dataset as a whole or to a series of subsets of the data. A match can be made when the comparison of the search key, qualified by the search criteria, matches at least a part of the dataset. The result of the search might be no matches, one match, or a plurality of matches.

The search criteria can include operators such as "equal to", "less than", "greater than", "not equal to", "less than or equal to", or "greater than or equal to". Additionally, any logical operators such as "AND", "OR", "NOT", and combinations of any logical operators, can be used either alone or in combination with other operators in searching the database.

The search can be initiated by the host 130 (e.g., command can be issued by a storage engine, such as the storage engine 104 of FIG. 1) issuing an initial command (e.g., SCSI write command) 401 to the memory system 108. The initial command 401 can include an indication of the search criteria and the search key.

The indication of the search criteria and the search key in the initial command (e.g., SCSI Write command) can be a bit set in a particular field of the command indicating that a buffer implied by and associated with the command contain the search criteria and the search key. For example, in a SCSI Write command, a high order bit of the incoming logical block address (LBA) can be set to indicate to indicate queued search criteria and search key in the buffer.

The memory system 108 receives the initial command 401 and reads the indication of the queued search criteria and search key in the buffer. The memory system 108 can then reply back the host 130 with an acknowledgment 402. The acknowledgement may be considered as optional as the host 130 can simply assume that the memory system 108 received the initial command 401.

The host 130 (e.g., storage engine) can then issue a second command (e.g., SCSI Read) 403 to the memory system 108 to indicate a readiness to receive the search results. The second command 403 can remain outstanding with no response from the memory system 108 until the memory system 108 has either completed the search or filled its internal buffer allocated for the search results. Once the buffer has been filled with the search results or the search reaches the end of the database, the memory system 108 can issue a response (e.g., sense data) 405 to the host 130 that indicates the search has been completed. This response (e.g., sense data) 405 can indicate the number of results found from the search, if any, and if the search has been completed or the buffer is simply full and needs to be read in order to empty the buffer.

If the response 405 from the memory system 108 indicates a non-zero number of search results, the host 130 can issue another command (e.g., SCSI Read) 407, in response to this indication, to retrieve the results from the memory system buffer. The memory system 108 can then issue another response (e.g., sense data) 409 that can contain the results of the search from the buffer.

If the results of the first read command 403 from the host 130 indicates that the search is not yet complete, the host 130 can return to this read step 403 and repeat the process until the search has been indicated as complete from the memory system 108.

FIG. 4B illustrates a protocol flow diagram of another embodiment of communication between the host (e.g., CPU, computer) 130 and the memory system 108, as described previously with reference to FIG. 1, during the method for autonomous memory searching. In the illustrated embodiment, three commands can be issued by the storage engine 104 to perform the search. For example, a write command (e.g., small computer system interface (SCSI) write command) followed by two or more read commands can be used to both transfer the search keys and search criteria to the memory system 108 as well as retrieve the results of the database search.

The search can be initiated by the host 130 (e.g., command can be issued by a storage engine, such as the storage engine 104 of FIG. 1) issuing an initial command (e.g., SCSI write command) 410 to the memory system 108. The initial command 410 can include an indication of the search criteria and the search key.

The indication of the search criteria and the search key in the initial command (e.g., SCSI Write command) can be a bit set in a particular field of the command indicating that a buffer implied by and associated with the command contain the search criteria and the search key. For example, in a SCSI Write command, a high order bit of the incoming logical block address (LBA) can be set to indicate to indicate queued search criteria and search key in the buffer.

The memory system 108 receives the initial command 410 and reads the indication of the queued search criteria and search key in the buffer. The memory system 108 can then reply back the host 130 with an acknowledgment 412. The acknowledgement may be considered as optional as the host 130 can simply assume that the memory system 108 received the initial command 410.

The initial command 410 can remain outstanding with no response from the memory system 108 until the memory system 108 has either completed the search or filled its internal buffer allocated for the search results. Once the buffer has been filled with the search results or the search reaches the end of the database, the memory system 108 can issue a response (e.g., sense data) 414 to the host 130 that indicates the search has been completed or the search results buffers are full in response to the search request. This response (e.g., sense data) 414 can indicate the number of results found from the search, if any, and if the search has been completed or the buffer is simply full and needs to be read in order to empty the buffer.

The memory system 108 can follow up the response 414 with the actual search results 416 (e.g., sense data), assuming a non-zero quantity of search results. The host 130 can acknowledge the correct receipt of the search results with a command 418 (e.g., SCSI read command).

The memory system 108 can relinquish the buffers that were associated with the search. This may be indicated to the host 108 by a response (e.g., sense data) 420 from the memory system 108.

During the protocol flow diagrams illustrated in FIGS. 4A and 4B, the memory system 108 can still continue to operate normally. Thus, the memory system 108 can still respond to normal read and write commands from the host 130.

Figure 5:
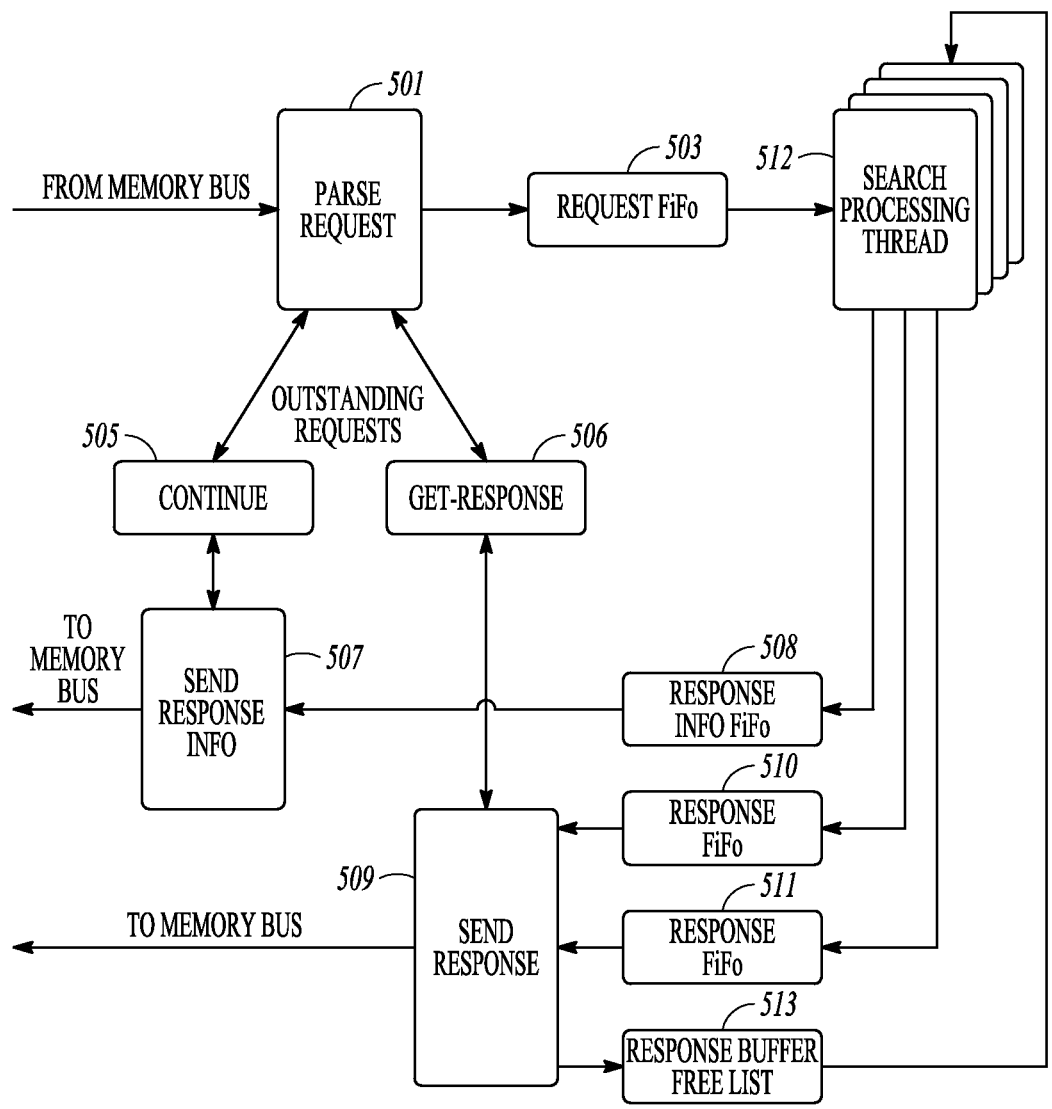
FIG. 5 illustrates a functional block diagram of an embodiment of the method for autonomous memory searching.

FIG. 5 illustrates a functional block diagram of an embodiment of the method for autonomous memory searching. The execution of this functional block diagram may be performed by the controller 201 of the memory system 108.

Commands (e.g., search requests, reads) can be received off the memory bus (e.g., Serial Advanced Technology Attachment (SATA)) from the host. The received command can be examined by parse block 501 to determine the type of command.

If the received command is a search request (e.g. SCSI Write command 401 of FIG. 4), it can be queued in the request first-in-first-out (FIFO) buffer 503 for use by the search processing threads 512. The buffer 503 can store the search keys and search criteria. If the received command is determined by the parse block 501 to be one of the two subsequent commands (e.g., SCSI Read 403, 407 of FIG. 4), indications of these commands can be stored in one of the two Outstanding Request buffers 505, 506.

The Continue buffer 505 can store an indication of the second command (e.g., SCSI Read 403 in FIG. 4) that requests the memory system to respond once the buffer is full or the search has been completed. This buffer 505 is coupled to the Send Response Info block 507 so that, when the Response Info FIFO 508 contains data indicating that the search is done (e.g., Response FIFOs 510, 511 are full, entire database has been searched), the Send Response Info block 507 can package the information response (e.g., Response 405 in FIG. 4) back to the host indicating that the buffers are full or the entire database has been searched.

The Get-Response buffer 506 can store an indication of the third command (e.g., SCSI Read 407 in FIG. 4) that requests the search results from the memory system. This buffer 508 is coupled to the Send Response block 509 so that, when the second command (e.g., SCSI Read 407 in FIG. 4) is received from the host, the Send Response block 509 can package the search results stored in the Response FIFO buffers 510, 511 and send the data to the host over the memory bus. Once these buffers 510, 511 have been emptied, an indication can be stored in the Response Buffer Free List 513 to indicate to the Search Processing Threads 512 that, if the search is still continuing, the Threads 512 can continue to fill up the buffers 510, 511.

The Search Processing Threads 512 each comprise a separate search as received from the host. By using multiple different Search Processing Threads 512, a plurality of separate searches can be performed substantially simultaneously (e.g., substantially in parallel, partially or completely overlapping).

When the initiating command (e.g., SCSI Write 401 in FIG. 4) is received from the host, the search criteria and the search keys can be forwarded to one of the Search Processing Threads 512. That particular Search Processing Thread 512 can then access the database record table (e.g., FIG. 3) to compare the search keys to the stored records according to the search criteria. Each Search Processing Thread 512 might be executing a separate search having different search criteria and search keys.

Once one of the Search Processing Threads 512 has either filled the buffers 510, 511 with results from the search or searched the entire database (e.g., search completed), an indication of what was accomplished can be stored in the Response Info FIFO 508. This indication can include a reference to the particular search to which the indication is referring in addition to the information as to whether the buffers 510, 511 are simply full or the search is complete. This indication can then be packaged by the Send Response Info block 507 and sent to the host, as previously discussed.

The functional blocks of FIG. 5 can be part of the memory system 108 and executed by the controller 201 in the memory system. The functional blocks can be a combination of hardware and software/firmware modules. Thus, not only can the multiple Search Processing Threads 512 enable a plurality of parallel searches, the processing to accomplish these searches can be performed by the memory system 108 which can reduce the workload on the host 130.

Figure 6A:
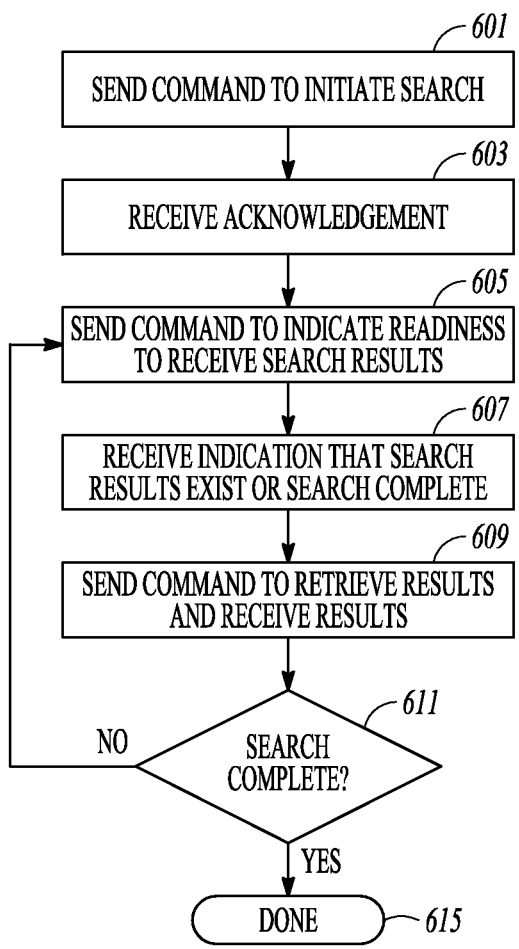
FIGS. 6A and 6B illustrate flowcharts of embodiments of the method for autonomous memory searching.

FIG. 6A illustrates a flowchart of an embodiment of the method for autonomous memory searching. The host can transmit a command (e.g., a SCSI Write command, search request) to the memory system in order to initiate the search 601. This command can include an indication as to the search key and the search criteria. The host can receive an acknowledgement from the memory system that the search request has been received 603.

The host can then send a command (e.g., a SCSI Read command) to the memory system that indicates to the memory system that the host is ready to receive any results from the search request 605. A response can be received from the memory system that can indicate either the search has been completed (e.g., entire database has been searched) or the search result buffers are full 607.

The host can then send a command (e.g., SCSI Read command) to the memory system to retrieve those search results 609 to which the memory system can respond with the search results. If the memory system has indicated that the search is not complete 611, the method repeats from the point where the host indicates its readiness to receive the search results 605. If the search has been completed, the method is done 615.

Figure 6B:
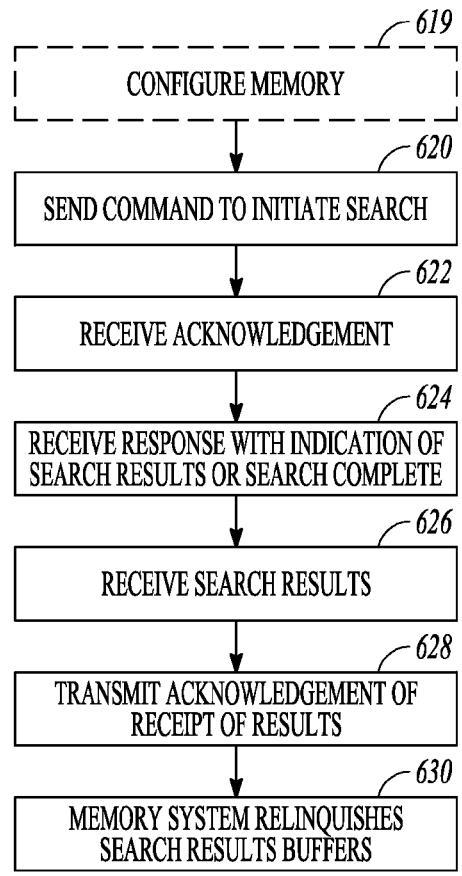

FIG. 6B illustrates a flowchart of another embodiment of the method for autonomous memory searching. In an optional step, the memory might be configured prior to a search request. For example, the transfer size configuration (e.g., size of the total responses before sending back to the requestor/initiator) might be set up, the maximum/minimum record and page sizes (e.g., sizes for the data structures stored and of the memory pages) might be set, the number of records per physical page might be set, partitioning of the drive for multiple regions, some supporting conventional reads and writes and others supporting data-structure-aware operation might be set, the existence of compression (e.g., enabling/disabling, algorithm used) might be set, and/or the existence of encryption (e.g., enabling/disabling, algorithm used) might be set.

The host can transmit a command (e.g., SCSI Write command, search request) to the memory system in order to initiate the search 620. This command can include an indication as to the search key and the search criteria. The host can receive an acknowledgement from the memory system that the search request has been received 622.

The memory system can issue a response to the host that indicates that the search has been completed or the search response buffers are full 624. The memory system can follow up this response with the actual search results 626. The host can then acknowledge receipt of the results and that the results were received correctly 628. The memory system can then relinquish the search results buffers that were associated with the search 630.

In another embodiment, the step of the memory system transmitting, and the host receiving, the indication that the search results exist (e.g., 607 and 624) can be combined with the step of the actual results being transmitted (e.g., 609 and 626).

While the embodiments of FIGS. 6A and 6B are illustrated from the point of view of the host, one skilled in the art will know that these embodiments also illustrate the process as performed by the memory system. In other words, when the host receives a response from the memory system, one skilled in the art will understand that the memory system transmitted that response.

Embodiments may be implemented in one or a combination of hardware, firmware, and/or software including memory 203 of FIG. 2. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The controller 201 of the memory system 108 can recognize the data structure format (e.g., as disclosed in FIGS. 3A and 3B) that is being searched. In order for the controller 201 to recognize the data structure, the software/firmware 210 has been written and/or upgraded to include, the attributes associated with that data structure. The controller can then parse the individual fields of the data structure and, thus, perform operations involving that particular data structure. For example, a particular data structure might have been used previously or information regarding that data structure might have been pre-stored in the software/firmware executed by the controller 201 prior to an actual use of the particular data structure. This information may include field descriptions in a database table, a database schema, a binary tree format, a graph structure or some other way to inform the memory system of the data structure format. All of this information may be part of (or updated to) the firmware/software of the controller so that the controller 201 knows what to expect when the particular database format is used in the memory system.

As an example of such an operation where the controller 201 can recognize the data structure format, a user might instruct a memory system 108 to search a list in a database located at address 0. The controller of the memory system could look at address 0 and find the proper format for the list. The controller's firmware (or is sent via firmware upgrade) comprises stored routines that allow it to recognize the format of the stored data structure. If it's assumed that the controller finds the first element of the list there, it now recognizes the structure of that list (instead of just treating it as generic data), it can look at and associate different data fields as something meaningful (e.g., a pointer to the next list node and the stored data). Since the list is being searched, the software/firmware can instruct the controller to parse the pointer to the next list node, follow it, and begin processing the next list node in the same fashion.

The controller 201 of the memory system 108 can understand how to allocate space for the storage of new data structures that have not yet been used by the memory system. For example, the controller can manage the storage in the memory array and allocate any of that storage for an incoming command.

The controller 201 of the memory system 108 can understand and accept commands (e.g., from the host 130) to alter a state of the database. In other words, the controller 201 might be configured to create a data base, create a table within the database, insert a record, delete a record, delete a table, or delete the database. The controller 201 can also alter the state of the database where an index on a particular dataset is requested by the host 130.

The controller 201 of the memory system 108 can control the memory system 108 such that a first memory system can act as a client to another database-enabled memory system. For example, if the memory system is an SSD, one SSD with a database might be a client to and respond to commands from another SSD with a database. This can provide one memory system with the ability to also search the other memory system with the same search criteria and search keys.

Figure 7:
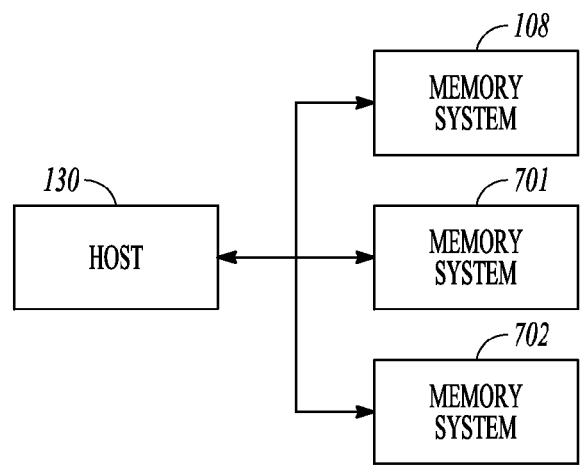
FIG. 7 illustrates a block diagram of a system having multiple memory systems.

FIG. 7 illustrates one example of such a system. The host 130 can be coupled to and communicate with a plurality of memory systems (e.g., SSDs) 108, 701, 702 where each of the memory systems 108, 701, 702 are substantially similar. The memory systems 108, 701, 702 can communicate not only with the host 130 but amongst themselves as well such that one memory system 701 can be a client to another memory system 108.

The controller 201 of the memory system 108 can also have additional functions as determined by the firmware/software 210 executed by the controller. These functions are for illustration purposes only as the controller 201 is not limited to only certain functions.

For example, the controller 201 can have the ability to reliably receive and control updating of the firmware/software 210. This can be used for updating the abilities of the controller 201. The controller 201 can create new data structures to store the search results, create new data structures resulting from multiple input data structures (e.g., MySQL™-style operations such as joins, unions, and other data manipulation operations), create new data structures based on a comparison of a common field in the data structure (e.g., MySQL™-style join based on comparison of equivalent data in a particular column in multiple records), assign a value to a field in a record based on an aggregate function of other records (e.g., MySQL™-style operations such as count, sum, average, standard deviation, and sum if).

The controller 201 can further have the ability to add redundancy to the records of a database to be able to detect errors (e.g., error correction code (ECC)). For example, the controller 201 might control the addition of the ECC when the data is stored in the memory such that the ECC is stored with in the database or the controller 201 can control adding the ECC to the search results prior to transmission to the host. The controller 201 can also replicate records such that the additional records can be examined in the case of errors detected in current records.

The controller 201 can further have the ability to create an index in one or more fields of the database in order to improve search performance. For example, the controller 201 can control storing of a flag in a particular field of each record so that a subsequent search can simply look for that flag to determine if that particular record meets the search key and search criteria.

The controller 201 can further have the ability to control the storing of the search results in a cache of the memory system. This cache may be the search results data buffers or another cache used for other purposes in the memory system.

The controller 201 can further have the ability to control the clearing of memory and/or the search results data buffer when an indication (e.g., write command) has been received that the search results have been correctly received. The controller 201 can further control the de-allocation of the memory locations (e.g., cache, data buffer, memory) used to store the search results.

An apparatus may be defined as circuitry, an integrated circuit die, a memory device, a memory array, or a system.

CONCLUSION

One or more embodiments of the apparatus and method for autonomous memory searching can perform a search of either a structured or unstructured dataset in a database of a memory system (e.g., SSD). The search can be executed entirely within the memory system without intervention from the external host. One or more search requests can be queued in the memory system. Multiple searches can be processed substantially in parallel. In a system with multiple memory systems (e.g., multiple SSDs), multiple searches per memory system can be queued. A dataset can reside in a single memory system or span multiple memory systems and be searched by a single search to the entire dataset.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

What is claimed is:

1. A method comprising:
issuing a search request to a memory being searched, wherein the search request is initiated by a predetermined bit set in a logical block address field of a write command transmitted to the memory, and wherein the logical block address field further includes bits indicating information to initiate the search request, such that the logical block address field in the write command includes the predetermined bit and the bits indicating the information to initiate the search request in place of a logical block address;
receiving an indication from the memory that a search of a database stored in the memory, initiated responsive to the information to initiate the search request, has been completed or that search results have been found;
when the search results have been found, retrieving the search results from data buffers in the memory in response to the indication and relinquishing the data buffers for use by the memory when the data buffers are empty; and
accessing the memory with read or write commands simultaneous with the search being performed by the memory according to the search request.

2. The method of claim 1 and further comprising receiving an acknowledgement from the memory, in response to the information to initiate the search request, that the search request has been received.

3. The method of claim 1 wherein receiving the indication from the memory that the search responsive to the search request has been completed or that the search results have been found comprises receiving an indication that the search has reached an end of the database stored in the memory.

4. The method of claim 1 wherein receiving the indication from the memory that the search performed responsive to the search request has been completed or that the search results have been found comprises receiving an indication that the data buffers in the memory are full.

5. The method of claim 1 wherein retrieving the search results from the memory in response to the indication comprises issuing a read command to the memory that causes the memory to transmit back the search results.

6. The method of claim 1 and further comprising issuing a read command to the memory to indicate to the memory that a host is ready to receive the search results.

7. The method of claim 1 and further comprising the memory receiving software updates.

8. A method comprising:
transmitting a first command to a memory system coupled to a host, the first command comprising an indication of a search request to search a database stored in the memory system, wherein the indication comprises a bit set in a logical block address field of the first command indicating the search request for a queued search criteria and search key, wherein the search criteria and the search key for the search request are stored in a data buffer of the memory system, and wherein the logical block address field in the first command further includes bits indicating information to perform the search request, such that the logical block address field in the first command includes the predetermined bit and the bits indicating the information to initiate the search request in place of a logical block address;
transmitting read or write commands to the memory system simultaneous with the memory system performing a search resulting from the search request;
transmitting a second command to the memory system, the second command comprising an indication to the memory system that the host is prepared to accept search results;
transmitting a third command to the memory system to retrieve the search results; and
receiving an indication from the memory system that the data buffer of the memory system associated with the search has been relinquished for use.

9. The method of claim 8 and further comprising receiving a response from the memory system, between transmitting the second command and transmitting the third command, comprising an indication that the memory system has search results or that the database has been searched in its entirety.

10. The method of claim 8 wherein the first command comprises a small computer system interface (SCSI) Write command, the second command comprises a SCSI Read command, and the third command comprises a SCSI Read command.

11. The method of claim 8 wherein the search criteria comprises one or more of: "equal to", "less than", "greater than", "not equal to", "less than or equal to", "greater than or equal to", "AND", "OR", or "NOT".

12. A method comprising:
queuing a plurality of received search requests corresponding to a plurality of searches of a database in memory, the plurality of received search requests queued into data buffers in the memory;
receiving a command from a host coupled to the memory, the command comprising a logical block address field with a bit indicating a request for performing the plurality of received search requests that are queued in the data buffers, wherein the logical block address field in the command further includes bits indicating information to perform the plurality of received search requests, such that the logical block address field in the command does not include a logical block address corresponding to the memory;
generating a plurality of searches of the database in response to the bit and the information to perform the plurality of received search requests, a respective one of the plurality of the searches being generated for each of the plurality of received search requests;
executing, substantially in parallel, the plurality of searches of the database;
receiving read or write commands from the host to initiate read or write operations in parallel with the plurality of searches;
transmitting an indication from the memory, for each respective one of the plurality of searches, that the respective search is complete or has generated search results; and
transmitting an indication to the host that the data buffers that were associated with the plurality of searches have been relinquished.

13. The method of claim 12 and further comprising transmitting a respective one of the search results to the host in response to a received command.

14. The method of claim 12 wherein each of the plurality of searches comprise a respective search key and respective search criteria.

15. A method comprising:
receiving, by a memory system, a first command from a host, the first command comprising an indication of a search request to search a database in the memory system, wherein the indication comprises a bit set in a logical block address field of the first command indicating the search request for a queued search criteria and search key, wherein the queued search criteria and the search key for the search request are stored in data buffers of the memory system, and wherein the logical block address field in the first command further includes bits indicating information to perform the search request, such that the logical block address field in the first command does not include a logical block address corresponding to the memory system;
receiving, by the memory system, a second command from the host, the second command comprising an indication to the memory system that the host is prepared to accept search results from the memory system;
executing, in response to the bit and the information to perform the search request, at least one search of the database using the queued search criteria and the search key;
receiving, in parallel with the at least one search, read or write commands from the host;
storing the search results in the data buffers; and
receiving, by the memory system, a third command from the host to retrieve the search results from the memory system.

16. The method of claim 15 and further comprising transmitting the data in the data buffers to the host in response to the third command.

17. The method of claim 15 and further comprising:
parsing the first, second, and third commands;
queuing the first command in a search request buffer;
storing respective indications of the second and third commands in outstanding request buffers;

storing an indication of search results in a response information buffer;
storing the search results in a response buffer;
transmitting an information response to the host in response to the indication of the second command and the indication of the search results; and
transmitting the search results from the response buffer in response to the indication of the third command and the indication of the search results.

18. The method of claim 17 and further comprising storing an indication in a response buffer free list after transmitting the search results from the response buffer.

19. The method of claim 15 and further comprising the memory system creating a data structure to store the search results.

20. The method of claim 15 wherein the search results contain data from a first data structure and further contain data from a second data structure in response to the first data structure.

21. The method of claim 20 wherein creating the second data structure comprises creating the second data structure based on a particular field present in both the first and second data structures.

22. The method of claim 15 and further comprising assigning a value to a field in a record in response to an aggregate function of other records in the search results.

23. A non-transitory computer-readable storage medium that stores instructions for execution by processing circuitry of a memory system for operations to perform a database search, the operations to perform the database search including:
queue a plurality of search requests, received by the memory system, for searches of a database stored in the memory system, the plurality of search requests queued in data buffers in the memory system;
receive a command from a host coupled to the memory system, the command comprising a logical block address field with a bit indicating a request for performing the plurality of search requests that are queued in the data buffers, wherein the logical block address field in the command further includes bits indicating information to perform the plurality of search requests, such that the logical block address field in the command does not include a logical block address corresponding to the memory system;
generate a plurality of searches in response to the bit and the information to perform the plurality of search requests, a respective search being generated for each of the plurality of search requests;
execute the plurality of searches substantially in parallel, the plurality of searches performed in parallel with read or write operations initiated by received read or write commands from the host; and
transmit an indication from the memory system, for each respective search, that the respective search has searched the database in its entirety or has generated search results.

24. The non-transitory computer-readable storage medium of claim 23 wherein the operations to perform the search further transmit the indication for each respective search in response to receipt of a command indicating readiness of a host to receive the search results.

25. The non-transitory computer-readable storage medium of claim 24 wherein the operations to perform the search further transmit the search results in response to a command indicating a read of the search results.

26. The non-transitory computer-readable storage medium of claim 25 wherein the operations to perform the search further store the search results in a buffer in the memory system until receiving the command indicating the read of the search results.

27. A memory system comprising:
a memory configured to store a database; and
a controller coupled to the memory, the controller configured to control:
receipt of a search request, queuing of the search request, corresponding to a search of the database, into data buffers in the memory,
generation of a search of the database in response to the search request and a received command, the received command comprising a logical block address field having a bit indicative of a request for performing the search request being queued, wherein the logical block address field in the received command further includes bits indicating information to perform the search request, such that the logical block address field in the received command does not include a logical block address corresponding to the memory,
execution of the search of the database substantially in parallel with other search requests and other memory operations in response to the bit and the queued search request,
transmission of a respective indication for each search indicating that the respective search is either complete or has generated search results, and
transmission of an indication that the data buffers associated with the search have been relinquished.

28. The memory system of claim 27 wherein the controller is further configured to control:
transmission of data buffers, comprising the search results, to a host in response to receipt of a command from the host requesting the search results; and
setting of an indication that the data buffers are empty following transmission of the search results.

29. The memory system of claim 27 wherein the database comprises an unstructured dataset.

30. The memory system of claim 27 wherein the database comprises a structured dataset.

31. The memory system of claim 27 wherein the memory system comprises a solid state drive and the memory comprises non-volatile memory.

32. The memory system of claim 27 wherein the database comprises a dataset that is stored in a plurality of memory systems and the controller is further configured to control execution of the search of the database across the plurality of memory systems.

33. The memory system of claim 27 wherein the controller is further configured to add error correction redundancy to the search results.

34. The memory system of claim 27 wherein the controller is further configured to control replication of search results.

35. The memory system of claim 27 wherein the controller is further configured to create an index in a field of one or more records of the search results.

36. The memory system of claim 27 wherein the controller is further configured to cache the search results.

37. The memory system of claim 27 wherein the controller is further configured to:
receive a command indicating the search results have been received; and clearing memory associated with the search results in response to the command indicating the search results have been received.

38. The memory system of claim 27 wherein the controller is further configured to de-allocate memory locations associated with the search results.

39. The memory system of claim 27 wherein the controller is further configured to store information regarding a data structure format.

40. The memory system of claim 39 wherein the information comprises field descriptions, database schema, binary tree information, or graph structures.

41. The memory system of claim 27 wherein the controller is further configured to allocate space for the storage of data structures.

42. The memory system of claim 27 wherein the controller is further configured to perform one or more of: altering a state of the database, creating the database, creating a table within the database, inserting a first record in the database, deleting a second record in the database, deleting a table in the database, and/or deleting the database.

43. A system comprising:
a plurality of memory systems, each memory system comprising:
   a memory configured to store a database; and
   a controller coupled to the memory, the controller configured to control:
      receipt of a search request, queuing of the search request, corresponding to a search of the database, into data buffers in the memory,
      generation of a search of the database in response to the search request and a received command, the received command comprising a logical block address field having a bit indicative of a request for performing the search request being queued, wherein the logical block address field in the received command further includes bits indicating information to perform the search request, such that the logical block address field in the received command does not include a logical block address corresponding to the memory,
   execution of the search of the database substantially in parallel with other search requests and read or write memory operations in response to the bit and the queued search request,
   transmission of a respective indication for each search indicating that the respective search is either complete or has generated search results, and
   transmission of an indication that the data buffers associated with the search have been relinquished;
wherein the plurality of memory systems are coupled together such that a first memory system is a client to a second memory system such that the search request is executed over both the first and the second memory systems.

* * * * *